(12) United States Patent
Zhang

(10) Patent No.: US 7,783,912 B2
(45) Date of Patent: Aug. 24, 2010

(54) SEQUENCING CONTROL CIRCUIT

(75) Inventor: Xiang Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 796 days.

(21) Appl. No.: 11/737,149

(22) Filed: Apr. 19, 2007

(65) Prior Publication Data

US 2008/0148086 A1 Jun. 19, 2008

(30) Foreign Application Priority Data

Dec. 15, 2006 (CN) .................... 2006 2 0016269 U

(51) Int. Cl.
*G06F 1/04* (2006.01)
*G06F 1/14* (2006.01)
(52) U.S. Cl. ................... 713/502; 713/330; 713/500; 714/56
(58) Field of Classification Search ........... 713/330, 713/500, 502; 714/56
See application file for complete search history.

(56) References Cited

U.S. PATENT DOCUMENTS

| 7,388,361 | B2* | 6/2008 | Hsieh et al. | 323/285 |
| 7,508,237 | B2* | 3/2009 | Kuo et al. | 326/93 |
| 2005/0283631 | A1* | 12/2005 | Kim | 713/330 |
| 2006/0126402 | A1* | 6/2006 | Kuo et al. | 365/189.05 |
| 2008/0046707 | A1* | 2/2008 | Hirai et al. | 713/1 |

* cited by examiner

*Primary Examiner*—Thomas Lee
*Assistant Examiner*—Jaweed A Abbaszadeh
(74) *Attorney, Agent, or Firm*—Frank R. Niranjan

(57) ABSTRACT

A sequencing control circuit includes a chip (30), a first control circuit (10), a second control circuit (20), and a lagging voltage terminal (700). The chip is connected to a first voltage terminal (100) and a second voltage terminal (300). The first control circuit is connected to the chip. The second control circuit is connected to a signal terminal (600) of an electronic component. The lagging voltage terminal is connected to the first control circuit for providing a signal posterior to a signal from the first voltage terminal. When the lagging voltage terminal and the signal terminal both input a high level signal, the output terminal of the first control circuit and the second control circuit both output a high level signal, thereby ensuring that the signal from the second voltage terminal is posterior to the signal from the first voltage terminal being input to the chip.

17 Claims, 2 Drawing Sheets

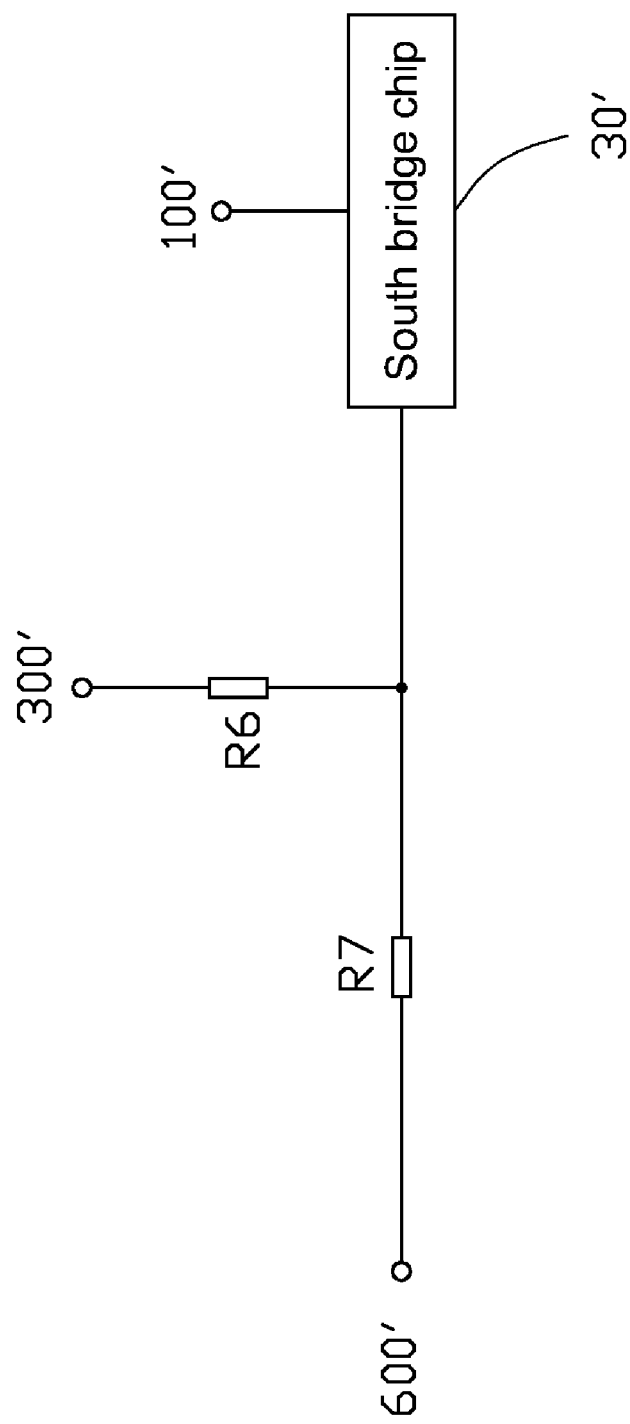
FIG. 2 <PRIOR ART>

SEQUENCING CONTROL CIRCUIT

BACKGROUND OF THE INVENTION

1. Field of the Invention

The present invention relates to sequencing control circuits, and more particularly to a sequencing control circuit for a south bridge chip on a motherboard of a computer.

2. Description of Related Art

A chipset is very important on a motherboard of a computer. The chipset usually includes a south bridge chip and a north bridge chip. The south bridge chip generally communicates with peripherals that include a PCI interface, an IDE controller for a hard disk or a DVD ROM drive, a USB controller, a floppy disk drive, a keyboard, and a mouse. The peripherals may be unusable if the south bridge chip is accidentally damaged due to abnormal sequencing signals.

FIG. 2 shows an example of a conventional sequencing control circuit, which has a south bridge chip 30', a first voltage terminal 100' being connected to the south bridge chip 30', a second voltage terminal 300', and a signal terminal 600' which receives a signal generated from a power supply or a super I/O chip. The second voltage terminal 300' is connected to the south bridge chip 30' through a resistor R6, and the south bridge chip 30' is also connected to the signal terminal 600' through a resistor R7. In a normal state, the signal received by the second voltage terminal 300' is input to the south bridge chip 30' after the signal received by the signal terminal 600' is input to the south bridge chip 30' and the signal received by the signal terminal 600' is input to the south bridge chip 30' posterior the signal received by the first voltage terminal 100'. Thereby the signal received by the second voltage terminal 300' is input to the south bridge chip 30' posterior to the signal received by the first voltage terminal 100'. At this time, the south bridge chip 30' is normal. In an abnormal state, the signal received by the signal terminal 600' is input to the south bridge chip 30' before the signal received by the first voltage terminal 100', then the signal received by the second voltage terminal 300' maybe is input to the south bridge chip 30' before the signal received by the first voltage terminal 100', at this time, the south bridge chip 30' is in a state of sequencing confusion.

What is needed, therefore, is a sequencing control circuit which can ensure normal sequencing for a south bridge chip on a motherboard of a computer.

SUMMARY OF THE INVENTION

A sequencing control circuit includes a chip, a first control circuit, a second control circuit, and a lagging voltage terminal. The chip is connected to a first voltage terminal, and a second voltage terminal through a node. A signal from the second voltage terminal is posterior to a signal from the first voltage terminal. An output terminal of the first control circuit is connected to the chip through the node. An input terminal of the second control circuit is connected to a signal terminal of an electronic component. An output terminal of the second control circuit is connected to the chip through the node. The lagging voltage terminal is connected to an input terminal of the first control circuit for providing a signal posterior to the signal from the first voltage terminal. When the lagging voltage terminal and the signal terminal of the electronic component both input a high level signal, the output terminals of the first and second control circuits output a high level signal, thereby ensuring that the signal from the second voltage terminal is input to the chip posterior to the signal from the first voltage terminal being input to the chip; when the lagging voltage terminal inputs a low level signal or the signal terminal inputs a low level signal, the second voltage terminal will be connected to ground.

Other advantages and novel features of the present invention will become more apparent from the following detailed description of preferred embodiment when taken in conjunction with the accompanying drawings, in which:

BRIEF DESCRIPTION OF THE DRAWINGS

FIG. 2 is a diagram of a conventional sequencing control circuit.

DETAILED DESCRIPTION OF THE INVENTION

Figure 1:
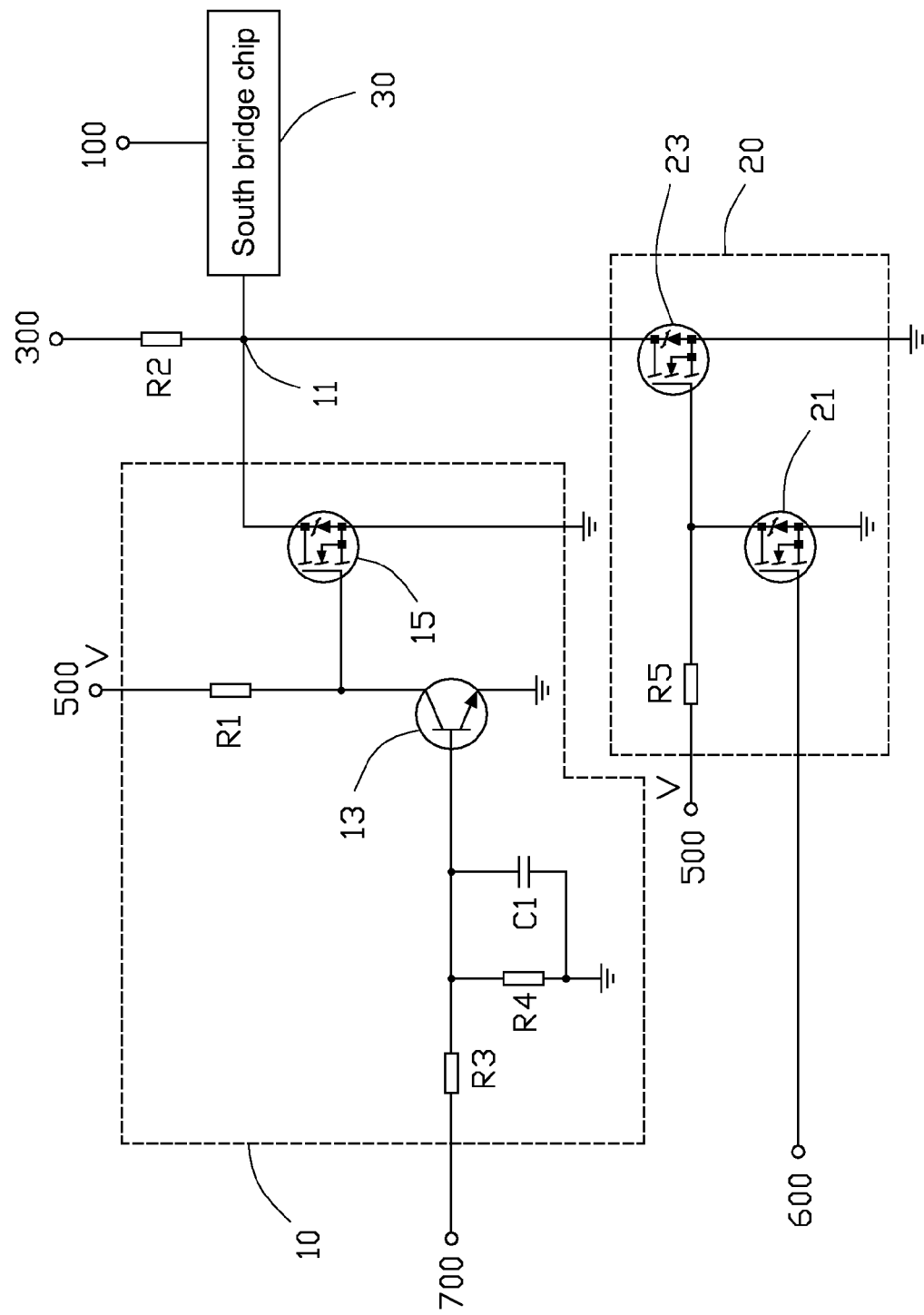
FIG. 1 is a diagram of a sequencing control circuit in accordance with a preferred embodiment of the present invention.

Referring to FIG. 1, a sequencing control circuit of a preferred embodiment of the present invention includes a south bridge chip 30, a first control circuit 10 and a second control circuit 20. A first voltage terminal 100 is connected to the south bridge chip 30. A lagging voltage terminal 700 is connected to an input terminal of the first control circuit 10. A signal terminal 600 of an electronic component, such as a power supply or a super I/O chip on a motherboard is connected to an input terminal of the second control circuit 20. Output terminals of the first control circuit 10 and the second control circuit 20 are both connected to an input terminal of the south bridge chip 30 through a common node 11. The second voltage terminal 300 is connected to the common node 11 through a resistor R2. A signal from the lagging voltage terminal 700 is posterior to a signal from the first voltage terminal 100 to the motherboard when a computer is powered on. The signal received by the second voltage terminal 300 is input to the south bridge chip 30 posterior to the signal received by the first voltage terminal 100 when the south bridge chip 30 is powered on normally.

The first control circuit 10 includes a first transistor 13 and a second transistor 15. The second transistor 15 of the preferred embodiment is a field effect transistor (FET). A base of the first transistor 13 is connected to the lagging voltage terminal 700 through a resistor R3. The resistor R3 and the base of the first transistor 13 are commonly connected to ground through a resistor R4 and a capacitor C1 connected in parallel. A collector of the first transistor 13 is connected to a power source terminal 500 through a resistor R1. An emitter of the first transistor 13 is connected to ground. A gate of the second transistor 15 is connected to the collector of the first transistor 13 and the power source terminal 500 through the resistor R1. A drain of the second transistor 15 is connected to the south bridge chip 30 through the common node 11. A source of the second transistor 15 is connected to ground. The second control circuit 20 includes a third transistor 21 and a fourth transistor 23. The third transistor 21 and the fourth transistor 23 of the preferred embodiment are field effect transistors (FETs). A gate of the third transistor 21 is connected to the signal terminal 600. A drain of the third transistor 21 is connected to the power source terminal 500 through a resistor R5. A source of the third transistor 21 is connected to ground. A gate of the fourth transistor 23 is connected to the drain of the third transistor 21. A drain of the fourth transistor 23 is connected to the south bridge chip 30 through the common node 11. A source of the fourth transistor 23 is connected to ground.

If the lagging voltage terminal 700 inputs a low level signal to the base of the first transistor 13 through the resistor R3, the first transistor 13 is turned off. The collector of the first transistor 13 outputs a high level signal to the second transistor 15, the second transistor 15 is turned on. The drain of the second transistor 15 outputs a low level signal. At this time, whether the signal terminal 600 inputs a high level signal or a low level signal, the second voltage terminal 300 will be connected to ground and the signal from the second voltage terminal 300 cannot be input to the south bridge chip 30.

If the lagging voltage terminal 700 inputs a high level signal to the base of the first transistor 13 through the resistor R3, the first transistor 13 is turned on. The collector of the first transistor 13 outputs a low level signal to the second transistor 15, the second transistor 15 is turned off. The drain of the second transistor 15 outputs a high level signal. At this time, if the signal terminal 600 inputs a high level signal to the gate of the third transistor 21, the third transistor 21 is turned on. The drain of the third transistor 21 outputs a low level signal to the fourth transistor 23, and the fourth transistor 23 is turned off. The drain of the fourth transistor 23 outputs a high level signal. Thereby, the second voltage terminal 300 can input a signal to the south bridge chip 30. The signal received by the lagging voltage terminal 700 to the motherboard is posterior to the signal received by the first voltage terminal 100 so that the signal received by the second voltage terminal 300 is posterior to the signal received by the first voltage terminal 100 to the south bridge chip 30.

If the signal terminal 600 inputs a low level signal to the gate of the third transistor 21, the third transistor 21 is turned off. The drain of the third transistor 21 outputs a high level signal to the fourth transistor 23, the fourth transistor 23 is turned on. The drain of the fourth transistor 23 outputs a low level signal. At this time, whether the lagging voltage terminal 700 inputs a high level signal or a low level signal, the second voltage terminal 300 will be connected to ground and the signal from the second voltage terminal 300 cannot be input to the south bridge chip 30.

When the south bridge chip 30 works normally, the signal received by the signal terminal 600 is input to the south bridge chip 30 posterior to the signal received by the first voltage terminal 100. If the power supply or the super I/O chip is accidentally damaged, the signal terminal 600 will receive an abnormal signal earlier than the signal received by the first voltage terminal 100. The drain of the fourth transistor 23 will output an earlier high level signal. At that time, if only the lagging voltage terminal 700 inputs a high level signal, the second voltage terminal 300 will input a signal to the south bridge chip 30 posterior to the signal received by the first voltage terminal 100. Thereby, the sequencing control circuit can ensure that the south bridge chip 30 is in the normal state.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sequencing control circuit, comprising:
    a chip being connected to a first voltage terminal, and a second voltage terminal through a node, a signal from the second voltage terminal being posterior to a signal from the first voltage terminal;
    a first control circuit, an output terminal of the first control circuit being connected to the chip through the node;
    a second control circuit, an input terminal of the second control circuit being connected to a signal terminal of an electronic component, an output terminal of the second control circuit being connected to the chip through the node; and
    a lagging voltage terminal being connected to an input terminal of the first control circuit for providing a signal posterior to the signal from the first voltage terminal;
    wherein when the lagging voltage terminal and the signal terminal of the electronic component both input a high level signal, the output terminals of the first control circuit and the second control circuit both output a high level signal, thereby ensuring that the signal from the second voltage terminal is input to the chip posterior to the signal from the first voltage terminal being input to the chip; when the lagging voltage terminal input a low level signal or the signal terminal input a low level signal, the second voltage terminal will be connected to ground.

2. The sequencing control circuit as described in claim 1, wherein the first control circuit comprises a first transistor and a second transistor, the first transistor being connected to the lagging voltage terminal, the second transistor being connected to the node.

3. The sequencing control circuit as described in claim 2, wherein the second transistor is a field effect transistor (FET).

4. The sequencing control circuit as described in claim 3, wherein the second transistor has a gate being connected to a collector of the first transistor, a drain being connected to the node and a source being connected to ground.

5. The sequencing control circuit as described in claim 1, wherein the second control circuit comprises a third transistor and a fourth transistor, the third transistor being connected to the signal terminal, the fourth transistor being connected to the node.

6. The sequencing control circuit as described in claim 5, wherein the third transistor and the fourth transistor are field effect transistors (FETs).

7. The sequencing control circuit as described in claim 6, wherein the third transistor has a gate being connected to the signal terminal and a drain being connected to a gate of the fourth transistor, the fourth transistor has a drain being connected to the node and a source being connected to ground.

8. The sequencing control circuit as described in claim 1, wherein when the lagging voltage terminal inputs a high level signal, the output terminal of the first control circuit also outputs a high level signal; when the lagging voltage terminal inputs a low level signal, the output terminal of the first control circuit also outputs a low level signal.

9. The sequencing control circuit as described in claim 1, wherein when the signal terminal inputs a high level signal, the output terminal of the second control circuit also outputs a high level signal; when the signal terminal inputs a low level signal, the output terminal of the second control circuit also outputs a low level signal.

10. The sequencing control circuit as described in claim 1, wherein the chip is a south bridge chip.

11. The sequencing control circuit as described in claim 1, wherein the electronic component is a power supply.

12. The sequencing control circuit as described in claim 1, wherein the electronic component is a super I/O chip.

13. A sequencing control circuit comprising:
    a chip being connected to a first voltage terminal and a second voltage terminal, a signal from the second voltage terminal being posterior to a signal from the first voltage terminal, a node between the second voltage terminal and the chip connected to a signal terminal of an electronic component;

a control circuit having an output terminal connected to the node between the second voltage terminal and the chip; and a lagging voltage terminal connected to an input terminal of the control circuit configured for providing a signal posterior to the signal from the first voltage terminal but anterior to the signal from the second voltage terminal;

wherein when the lagging voltage terminal inputs a low level signal, the output terminal of the control circuit grounds the node between the second voltage terminal and the chip which results in the signal from the second voltage terminal being grounded at the node, and when the lagging voltage terminal inputs a high level signal, the output terminal of the control circuit outputs a high level signal thereby maintaining the signal from the second voltage terminal being input to the chip posterior to the signal from the first voltage terminal being input to the chip when the signal terminal of the electronic component receives an abnormal signal anterior to the signal received by the first voltage terminal.

14. The sequencing control circuit as described in claim 13, wherein the control circuit comprises a first transistor and a second transistor, the first transistor connected to the lagging voltage terminal, the second transistor being connected to the node.

15. The sequencing control circuit as described in claim 14, wherein the first transistor comprises a base connected to the lagging voltage terminal, an emitter connected to ground, and a collector, and the second transistor is a field effect transistor and has a gate connected to the collector of the first transistor, a drain connected to the node and a source connected to ground.

16. The sequencing control circuit as described in claim 13, wherein the signal terminal of the electronic component is connected to the node via two field effect transistors.

17. The sequencing control circuit as described in claim 13, wherein the chip is a south bridge chip.

* * * * *